United States Patent [19]
Mackay et al.

[11] Patent Number: 5,485,044
[45] Date of Patent: Jan. 16, 1996

[54] MOTOR WITH END PLAY INSERT

[75] Inventors: Jeffrey L. Mackay, LaSalle, Mich.; Paul J. Keutgens, Toledo, Ohio; Eric A. Forsell, Sterling Heights, Mich.

[73] Assignee: United Technologies Automotive, Inc., Dearborn, Mich.

[21] Appl. No.: 130,026

[22] Filed: Sep. 30, 1993

[51] Int. Cl.⁶ .................................................. H02K 15/14
[52] U.S. Cl. ............................... 310/90; 310/42; 310/43; 29/598
[58] Field of Search ................... 310/42, 90, 43, 310/51, 91; 29/596, 598

[56] References Cited

U.S. PATENT DOCUMENTS

| | | | |
|---|---|---|---|
| 1,618,877 | 2/1927 | Henry | 310/90 |
| 2,030,260 | 2/1936 | Lewis | 310/90 |
| 2,847,593 | 8/1958 | Selbach et al. | 310/90 |
| 4,199,861 | 4/1980 | Buckman et al. | 29/598 |
| 4,321,748 | 3/1982 | Ito | 29/596 |
| 4,455,498 | 6/1984 | DeSisto | 310/42 |
| 4,845,396 | 7/1989 | Huber | 310/239 |
| 4,914,332 | 4/1990 | Borcherding et al. | 310/90 |
| 5,089,736 | 2/1992 | Oyafuso | 310/90 |
| 5,144,738 | 9/1992 | Oyafuso | 29/596 |
| 5,152,588 | 10/1992 | Bright et al. | 303/115 EC |
| 5,204,567 | 4/1993 | Kinoshita et al. | 310/90 |
| 5,254,893 | 10/1993 | Ide | 310/90 |

FOREIGN PATENT DOCUMENTS

| | | |
|---|---|---|
| 0335352 | 10/1989 | European Pat. Off. . |
| 2271693 | 5/1975 | France . |
| 4038317 | 6/1991 | Germany . |
| 4243716 | 6/1994 | Germany . |
| WO91/03095 | 3/1991 | WIPO . |

OTHER PUBLICATIONS

Publication No. JP63270111 of Japanese Patent Abstract, Aug. 11, 1988, "Plastic Composite Member and Its Manufacture".

Primary Examiner—Steven L. Stephan
Assistant Examiner—D. R. Haszko
Attorney, Agent, or Firm—Harness, Dickey & Pierce

[57] ABSTRACT

A motor has an end play insert which is installed within a tunnel of a housing proximate with an end of an armature shaft. This insert is installed a predetermined distance into the tunnel so as to set the armature shaft in a selected and consistent longitudinal position relative to the housing, thereby accurately controlling the end play of this armature shaft.

38 Claims, 3 Drawing Sheets

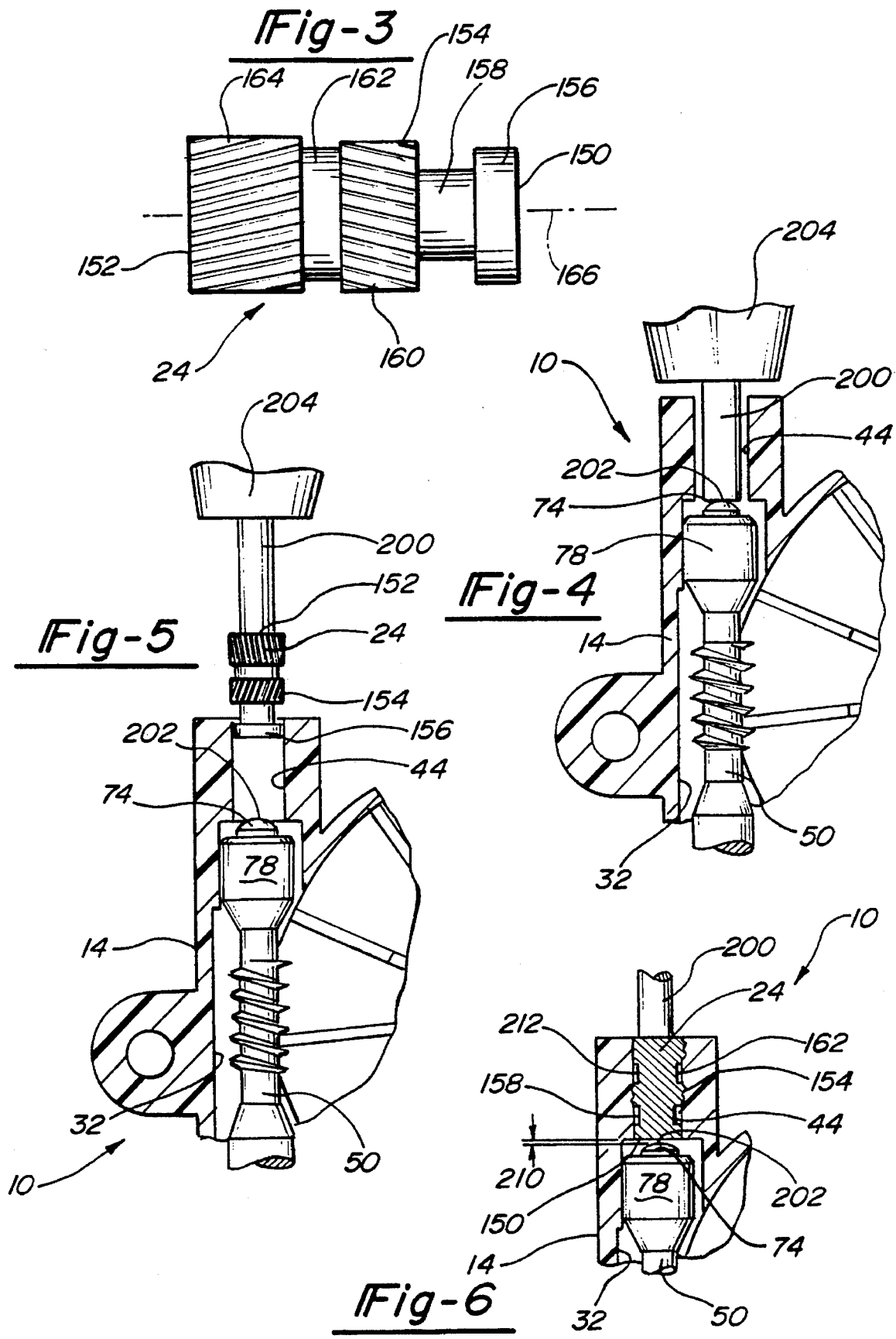

MOTOR WITH END PLAY INSERT

BACKGROUND OF THE INVENTION

This invention relates generally to motors and specifically to an electromagnetic motor having an insert for controlling end play of an armature therein.

Direct current (dc) electromagnetic motors are used in automotive vehicles for various purposes. For example, dc motors are used in automobiles to operate window lifts, windshield wipers, anti-lock braking systems, seat adjustments, and other devices. The motors often have a housing with a longitudinally extending bore within which is journalled an armature and an armature shaft positioned in operative association with a fixed stator. Maintaining a proper longitudinal internal clearance or end play of the armature shaft relative to the associated stator and housing is important in the operation of the motor. Insufficient clearance between the longitudinal ends of the armature shaft and adjacent portion of the housing results in excessive wear and may prevent fractional horsepower motors from starting. On the other hand, excessive clearance results in objectional end bumping noises when the armature shaft thrusts back and forth during start up or directional changes of the motor. Excessive clearance can further create alignment problems between the armature shaft and associated driven components such as gears, cables and the like.

The end of the armature shaft is conventionally supported by means of a threaded bolt and a locking nut which are inserted into a tunnel concentrically intersecting the housing bore proximate with a distal end of the armature shaft. This conventional method, however, often requires extra water seals, is relatively time consuming and costly to assemble, and is operator sensitive. Another conventional end support device consists of injection molding a plastic plug into the tunnel of the housing. This plastic plug is allowed to cool, thereby shrinking, thus creating a clearance to the armature shaft. Also, a variety of inserted shims are used between the end of the armature shaft and an adjacent abutting end of the housing. While these traditional devices have improved the end play control of the armature shaft relative to the adjacent housing, the aforementioned motors are costly to manufacture and still have end play clearance problems.

Other devices and methods for reducing end play are disclosed in the following U.S. Pat. Nos. 5,144,738 entitled "Automatic Retention Adjustment of Motor Armature Assembly," which issued to Oyafuso on Sep. 8, 1992; 4,914,332 entitled "Dynamoelectric Machine Shaft Restrictor for Controlling End Play," which issued to Borcherding et al. on Apr. 3, 1990; 4,455,498 entitled "Means for Adjusting Motor End Play," which issued to DeSisto on Jun. 19, 1984, all of which are incorporated by reference herewithin. Alternately, U.S. Pat. No. 4,199,861 entitled "Method of Making An End Play Control Assembly," which issued to Buckman et al. on Apr. 29, 1980 teaches using an ultrasonic weld to join a bushing and a thrust collar together around one end of the motor shaft so as to rotate with the shaft; this is also incorporated by reference herewithin.

Accordingly, it would be desirable to have a motor with an automatically adjustable end play insert set to account for each motor's specific tolerance conditions.

SUMMARY OF THE INVENTION

In accordance with the present invention, the preferred embodiment of a new and useful motor has an end play insert which is installed within a tunnel of a housing proximate with an end of an armature shaft. This insert is installed a predetermined distance into the tunnel so as to set the armature shaft in a selected and consistent longitudinal position relative to the housing, thereby accurately controlling the end play of this armature shaft. The motor further has a stator and an armature. In another aspect of the present invention, a method is provided for measuring the longitudinal relationship between the armature shaft and the housing and then accurately installing an insert into an end of the housing thereby accounting for the specific part tolerances and controlling the end play of the armature shaft.

The present invention is advantageous over the prior art in that the insert can be accurately installed into the housing so as to account for each specific motor tolerance stack-up. Furthermore, the present invention is highly automated thereby reducing operator error and inconsistencies. Accordingly, obtrusive end play-induced noise and operating thrusts are reduced. Another advantage is that the present invention uses an inexpensive and unthreaded insert that does not require a locking nut or a separate water tight seal. Additional advantages and features of the present invention will become apparent from the following description and appended claims, taken in conjunction with the accompanying drawings.

BRIEF DESCRIPTION OF THE DRAWINGS

FIG. 3 is a side elevational view of an insert used in the present invention motor of FIG. 1; and FIGS. 4 through 6 are fragmentary side elevational views partially in section, taken along line 2—2 of FIG. 1, showing the installation steps used to install the insert into the present invention motor.

DETAILED DESCRIPTION OF THE PREFERRED EMBODIMENT

Figure 1:
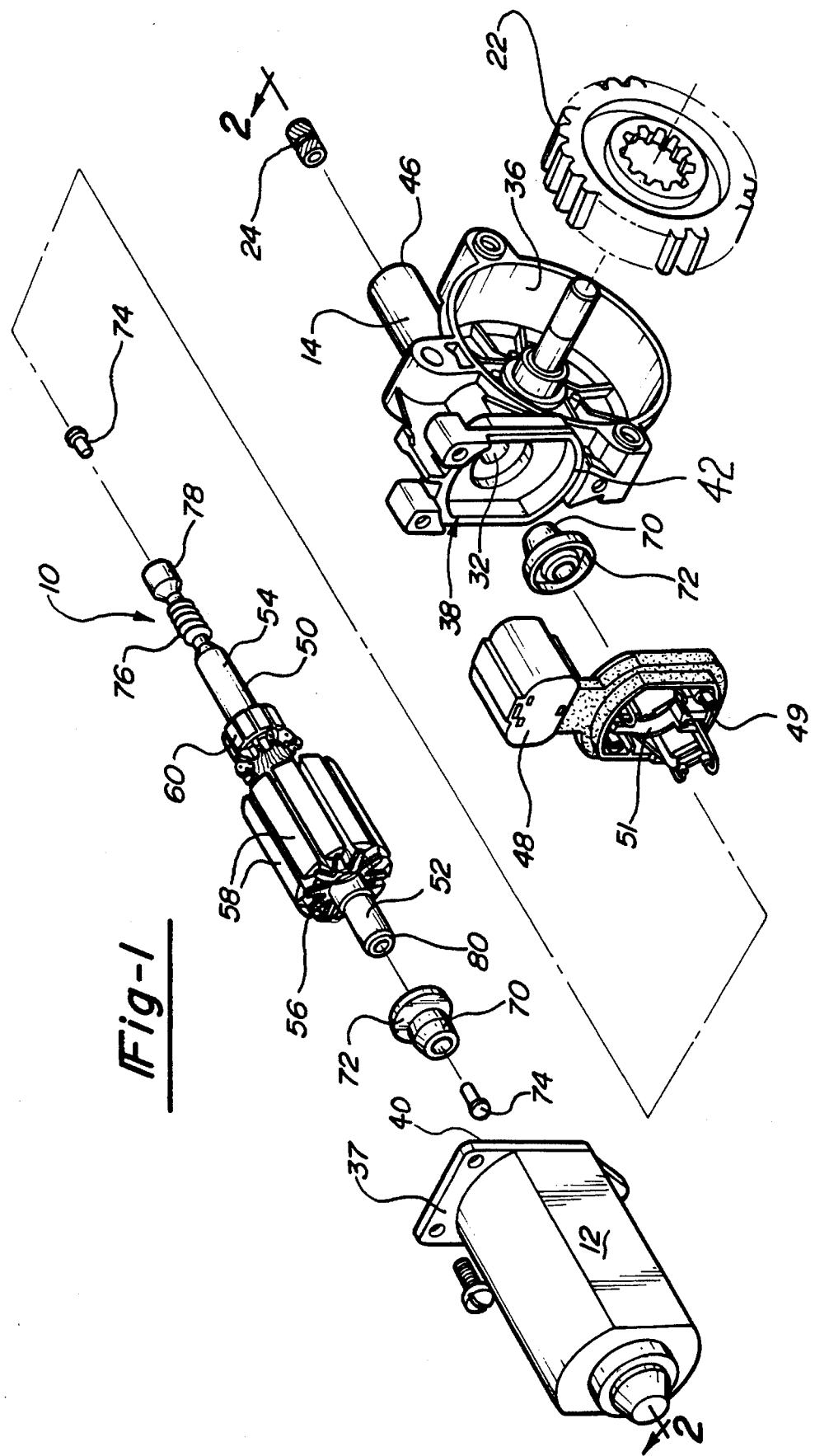
FIG. 1 is an exploded perspective view of the preferred embodiment of the motor/of the present invention.
Figure 2:
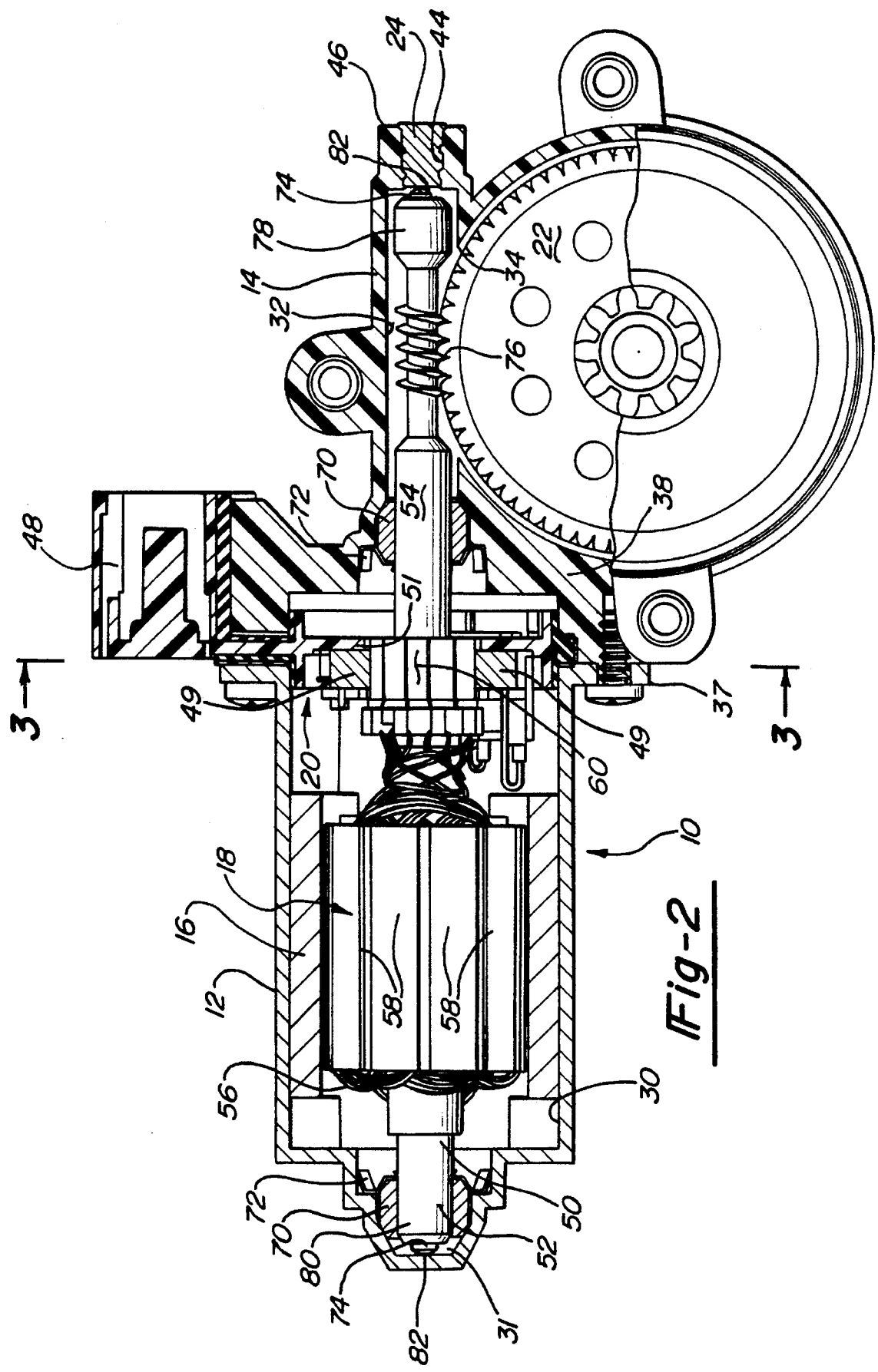
FIG. 2 is a side elevational view partially in section, taken along line 2—2 of FIG. 1, of the present invention motor.

Typically, fractional force power dc-motors are used in automotive vehicles to operate side window lift mechanisms, to drive windshield wiper mechanisms, to operate anti-lock braking systems and to move other mechanized componentry. Referring to FIGS. 1 and 2, a motor is shown having an armature housing 12, a gear housing 14, a stator 16, a rotor or armature 18, a brush card assembly 20, a gear 22 and an end play insert 24. Armature housing 12 has a substantially cylindrical bore 30 extending therein defined by an inside surface, against which stator 16 is internally mounted. Moreover, stator 16 is permanently magnetic in nature. An abutting end wall 31 of armature housing 12 is located at an end of bore 30. Gear housing 14 also has a bore 32 extending longitudinally therewithin defined by an inside surface and further has a transverse passageway 34 therethrough which intersects a gear cavity 36. A tunnel 44, defined by an inner surface, runs through a constricted end 46 of gear housing 14 and concentrically intersects bore 32. Armature housing 12 and gear housing 14 both have a flange, respectively 37 and 38, projecting therearound proximate with an open end 40 and 42 of each housing 12 and 14, respectively. Armature housing 12 is preferably made from a stamped metallic material and gear housing 14 is preferably injection molded from a 45% glass filled Zytel which can be purchased from DuPont. Additionally, an electrical connector 48 is integrally molded as part of brush card assembly 20. Brush card assembly 20 has a pair of brushes 49 and an inner edge 51 which defines an aperture. Inner edge 51 and brushes 49 surround commutator 60.

Armature 18 is centrally mounted around an armature shaft 50. Armature shaft 50 has a pedestal segment 52 and a driving segment 54 protruding longitudinally from each end of armature 18. Furthermore, armature 18 is an electromagnetic device constructed from a plurality of wire windings 56 wrapped inside a plurality of armature pack slots which are juxtaposed between a plurality of magnetically conductive armature teeth 58. A commutator 60 is positioned longitudinally adjacent to armature 18 and surrounds armature shaft 50 near driving segment 54. Armature shaft 50 is rotatably journalled within armature and gear housings 12 and 14, respectively, by a pair of bearings 70 and retainers 72. Moreover, a pair of polymeric thrust buttons 74 are inserted into a first and a second end, respectively 78 and 80, of armature shaft 50 thereby providing bearing surfaces 82. Driving segment 54 of armature shaft 50 contains a helically threaded engagement pattern 76 which operably engages gear 22 thereby providing a drive means for operating a window lift mechanism or the like.

As can best be seen in FIG. 3, insert 24 has an inboard end 150, an opposite outboard end 152 and an outside surface 154. Outside surface 154 is substantially cylindrical in shape and is divided into a plurality of varying diametral segments. Insert 24 is further defined by an inboard segment 156, a neck segment 158, a median segment 160, a waist segment 162 and an outboard segment 164, all being in longitudinal axial alignment with one another. Inboard segment 156 has a smaller transverse dimension, measured normal to a longitudinal axis 166, as compared to median segment 160 and outboard segment 164. Furthermore, neck segment 158 has a smaller transverse dimension than does inboard segment 156 and waist segment 162. Moreover, waist segment 162 has a smaller transverse dimension than does median and outboard segments, respectively 160 and 164. Also outside surface 154 has a herringbone knurl pattern at median segment 160 and outboard segment 164. Insert 24 is preferably made from a brass material.

The method of installing insert 24 into tunnel 44 of gear housing 14 is illustrated in FIGS. 4 through 6. But first, referring to FIG. 2, motor 10 is preassembled such that armature shaft 50 is inserted within bore 32 of gear housing 14. Subsequently, armature housing 12 is placed vertically into a holding fixture so that thrust button 74 adjacent to second end 78 is positioned against abutting end wall 31 of armature housing 12. Second, referring to FIG. 4, a probe member 200 is inserted into tunnel 44 so as to firmly touch bearing surface 82 of thrust button 74 proximate with first end 78 of armature shaft 50. Probe member 200 is preferably attached to an ultrasonic welding horn 204 which is operably connected to a measuring device and a personal computer. It has been found acceptable to use a 20 kHz computer controlled probe member and ultrasonic welding horn system which can be purchased from Dukane Corporation of Saint Charles, Ill. Concurrently, the measuring device and computer calculate the relative longitudinal relationship between bearing surface 82 on armature shaft 50 in relation to armature housing 12 (see FIGS. 1 and 2). Therefore, unlike the traditional prior art methods, the present invention method determines the true tolerance stack-up of the armature shaft in relation to the adjacent housings rather than relying upon a theoretical and generalized average part stack-up. Next, probe member 200 is withdrawn from tunnel 44.

The next step is illustrated in FIG. 5 wherein inboard segment 156 of insert 24 is either manually or automatically inserted partially within tunnel 44. Ultrasonic horn 204 and probe member 200 then supply ultrasonic frequencies to insert 24 thereby creating high frequency vibrations therein. Concurrently, probe member 200 and ultrasonic horn 204 supply approximately 20 pounds of compressive force against outboard end 152 of insert 24. Accordingly, the polymeric material of gear housing 14 surrounding tunnel 44 is melted by the ultrasonic vibrations created along the proximate outside surface 154 of insert 24. Thus, insert 24 can be easily inserted within tunnel 44. Referring to FIG. 6, the computer software uses the measured distance of bearing surface 82 in relation to the adjacent housings 12 and 14 to compute a predetermined desirable installation distance of insert 24 into tunnel 44. The computer software also provides for a small gap 210 between bearing surface 82 and inboard end 150 of insert 24. This gap 210 is approximately 0.010 inch to allow for longitudinal expansion of armature shaft 50 due to internally and externally generated heat. As can also be observed in FIG. 6, the plastic material of gear housing 14 surrounding tunnel 44 flows around outside surface 154 of insert 24 so that when the ultrasonic frequencies are removed, the plastic material such as that denoted as 212 resolidifies and securely engages the knurl pattern and waist segment 162. Furthermore, neck segment 158 of insert 24 serves to clear and receive undesirable molded flash from within tunnel 44 during insertion therein. Insert 24 has an optimum minimum push-out force of approximately 900 pounds which is equivalent to current motor end play system standards.

The software used to control probe member 200 and ultrasonic horn 204 is incorporated into the Dukane Corporation equipment. Version 3.×3 of Dukane UltraCom software can compensate for varying armature shaft 50 lengths by dividing the process into two distinct cycles: the measuring cycle and the welding cycle. The two cycles are linked together using the sequencing feature of the standard UltraCom software. The measuring cycle is a process cycle that performs no welding operation to the part. When the horn contacts the part and the trigger is activated, either by a trigger switch closure or a force measurement, the downstroke distance of control probe member 200 is recorded as a program variable. The press then retracts and the sequence control variables increment to the next setup, the welding cycle. The welding cycle uses a Weld By Absolute Distance method. The absolute distance is calculated automatically by the system based on the downstroke distance recorded during the measuring cycle and a user selected distance offset corresponding to housings 12 and 14. The distance offset is the longitudinal length of insert 24 and the gap 210 desired between insert 24 and armature shaft 50. The calculation is as follows:

Absolute Weld Distance=Downstroke Distance (last cycle)–Distance Offset.

The welding cycle terminates when the press head reaches the absolute distance as calculated above.

As can be observed by one skilled in the art, the present invention has many advantages over the prior art. For example, the present invention gear housing can be manufactured less expensively and with lower cost tooling since no threads are required within the tunnel. Furthermore, the insert provides a water tight seal within the tunnel thereby eliminating the traditional need for added sealing. Also, various parts and assembly labor are reduced thereby lowering assembly costs. Significantly, end play is more accurately controlled within each individual motor since real tolerance stack-up measurements are accounted for rather than using theoretical generalities. Accordingly, the end play correction is more accurate, has less operator error, and substantially reduces undesirable noise.

While the preferred embodiment of a motor with an end play insert and a method for producing such have been disclosed, it will be appreciated that various modifications may be made without departing from the present invention. For example, devices other than an ultrasonic horn may be used to melt the housing adjacent to the insert. Furthermore, the probe may be a separate apparatus from the ultrasonic welding horn. Additionally, while a specific flat shape on the inboard end of the insert has been shown, the inboard end may have a variety of alternate shapes thereto. The bearing surfaces may also be directly integrated into each end of the armature shaft. Moreover, while specific dc armature, commutator, stator and thrust button constructions have been described, many other direct current and even alternating current motor designs can use such an insert and method for installing such. Of course, a motor having the aforedescribed insert can be used in many non-automotive systems. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. A motor comprising:
   a housing having a bore defined by an inside surface extending longitudinally therewithin, a tunnel defined by an inner surface extending through an end of said housing and intersecting said bore proximate therewith;
   a stator mounted internal to a predetermined longitudinal portion of said housing congruent with said bore therewithin;
   an armature concentrically juxtapositioned with said bore of said housing thereof, said armature being rotatable in relation to said stator due to electromagnetic fields therebetween;
   an armature shaft centrally extending through said armature and protruding from each end thereof, said armature shaft concentrically juxtapositioned within said bore of said housing such that said armature and said armature shaft are rotatably journalled therewithin, said armature shaft having a first end and a second end thereof with each having a bearing surface thereon; and
   an insert having an outside surface bordered by an inboard end and an outboard end thereof, said insert being firmly affixed within said tunnel of said housing such that no supplemental retention of said insert is necessary, said outside surface of said insert being unthreaded thereabout, said bearing surface at said first end of said armature shaft being in rotatable contact with said inboard end of said insert thereagainst such that said armature shaft is maintained in a predetermined longitudinal position relative to said housing adjacent thereto.

2. The motor of claim 1 wherein said insert further includes:
   an inboard segment proximate with said inboard end adjacent thereto;
   a neck segment longitudinally projecting from said inboard segment thereagainst;
   a median segment longitudinally projecting from said neck segment thereagainst opposite from said inboard segment thereacross;
   a waist segment longitudinally projecting from said median segment thereagainst opposite from said neck segment thereacross;
   an outboard segment longitudinally projecting from said waist segment thereagainst, said outboard segment being proximate with said outboard end adjacent thereto; and
   said neck segment and said waist segment having a smaller transverse dimension than said median segment and said outboard segment therenear.

3. The motor of claim 2 wherein:
   said inboard segment of said insert has a smaller transverse dimension than said median segment and said outboard segment as compared thereto, said neck segment also has a smaller transverse dimension than said inboard segment adjacent thereto; and
   said outside surface at said inboard segment, neck segment, median segment, waist segment and outboard segment is substantially cylindrical in shape about a longitudinal axis therethrough.

4. The motor of claim 3 wherein:
   said inboard edge and said outboard edge of said insert are substantially flat.

5. The motor of claim 2 wherein:
   said outside surface at said median and outboard segments of said insert have a herringbone knurl pattern therearound.

6. The motor of claim 1 wherein:
   said insert is positioned within said tunnel of said housing by being compressibly inserted therein, an ultrasonic welding horn applies pressure upon said insert while transmitting ultrasonic frequencies therethrough so as to melt an adjacent portion of said housing surrounding said tunnel therethrough, said adjacent portion of said housing surrounding said tunnel subsequently resolidifying so as to securely engage said outside surface of said insert therein upon removal of said ultrasonic frequencies therefrom, whereby said insert is firmly affixed within said tunnel of said housing thereof.

7. The motor of claim 6 wherein:
   said insert is longitudinally installed within said tunnel of said housing thereof a predetermined distance based upon measurements taken within said motor.

8. The motor of claim 7 wherein:
   said predetermined installation distance of said insert is set by a member being inserted within said tunnel of said housing prior to insertion of said insert therein, said inserted member measures a dimensional relationship between said bearing surface at said first end of said armature shaft in relation to said housing thereabout, 9. The motor of claim 1 further comprising:
   a plurality of wire windings being mounted upon said armature thereof for creating an electromagnetic field therearound; and
   a commutator surrounding a predetermined portion of said armature shaft therearound and being electrically coupled to said armature longitudinally adjacent thereto.

10. The motor of claim 9 further comprising:
    a brush card assembly having an aperture therethrough defined by an inner edge thereabout, said brush card assembly retaining a pair of electrically conductive brushes thereon such that said pair of brushes are proximate with said inner edge surrounding said aperture therein, said brush card assembly attached to said housing with said armature shaft extending through said aperture therein such that said commutator is displaced between said pair of brushes thereabout, said pair of brushes supplying electrical current to said commutator therewithin.

11. The motor of claim 1 wherein:

said armature shaft further has an engagement pattern thereon longitudinally juxtapositioned between said armature and said first end thereof, said engagement pattern of said armature shaft propels a drive mechanism enmeshed therewith.

12. The motor of claim 11 wherein:

said drive mechanism is in operative association with a window lift mechanism of an automotive vehicle.

13. The motor of claim 11 wherein:

said drive mechanism is in operative association with an anti-lock braking system of an automotive vehicle.

14. The motor of claim 11 wherein:

said drive mechanism is in operative association with a windshield wiper mechanism of an automotive vehicle.

15. The motor of claim 1 wherein:

direct electrical current is supplied thereto.

16. The motor of claim 1 wherein:

alternating electrical current is supplied thereto.

17. The motor of claim 1 wherein said housing includes:

an armature housing surrounding said armature therewithin; and a gear housing surrounding said first end of said armature shaft thereof.

18. A fractional horse power direct current motor for use in an automotive vehicle comprising:

an armature housing and a gear housing both having a bore defined by an inside surface extending longitudinally therewithin, a tunnel defined by an inner surface extending through an end of said gear housing and intersecting said bore proximate therewith;

a stator mounted internal to a predetermined longitudinal portion of said housing congruent with said bore therewithin;

an armature concentrically juxtapositioned within said bore of said armature housing thereof, said armature being rotatable in relation to said stator due to electromagnetic fields therebetween, said armature housing surrounding said armature therewithin;

an armature shaft centrally extending therethrough and protruding from each end thereof, said armature and said armature shaft being concentrically juxtapositioned within said bore of said housing such that said armature and said armature shaft are rotatably journalled therewithin, said armature shaft having a first end and a second end thereof with each having a bearing surface thereon, said gear housing surrounding said first end of said armature shaft thereof, said armature shaft further having an engagement pattern thereon longitudinally juxtapositioned between said armature and said first end thereabout, said engagement pattern of said armature shaft propelling a drive mechanism enmeshed therewith;

a commutator surrounding a predetermined portion of said armature shaft therearound and being electrically coupled to said armature longitudinally adjacent thereto;

a brush card assembly having a support member therein with an aperture therethrough defined by an inner edge thereabout, said support member retaining a pair of electrically conductive brushes thereon such that said brushes are proximate with said inner edge surrounding said aperture therein, said support member further having an interface portion thereof which attaches with said housing, said armature shaft extending through said aperture within said brush card assembly such that said commutator is displaced between said pair of brushes thereabout, said pair of brushes supplying electrical current to said commutator therewithin; and an insert having an outside surface bordered by an inboard end and an outboard end thereof, said insert being firmly affixed within said tunnel of said gear housing such that no supplemental retention of said insert is necessary, said outside surface of said insert being unthreaded thereabout, said bearing surface at said first end of said armature shaft being in rotatable contact with said inboard end of said insert thereagainst such that said armature shaft is maintained in a predetermined longitudinal position relative to said housings adjacent thereto.

19. The motor of claim 18 wherein said insert further includes:

an inboard segment proximate with said inboard end adjacent thereto, said inboard end being substantially flat;

a neck segment longitudinally projecting from said inboard segment thereagainst;

a median segment longitudinally projecting from said neck segment thereagainst opposite from said inboard segment thereacross;

a waist segment longitudinally projecting from said median segment thereagainst opposite from said neck segment thereacross;

an outboard segment longitudinally projecting from said waist segment thereagainst, said outboard segment proximate with said outboard end adjacent thereto, said outboard end being substantially flat;

said neck segment and said waist segment having a smaller transverse dimension than said median segment and said outboard segment therenear, said inboard segment of said insert having a smaller transverse dimension than said median segment and said outboard segment as compared thereto, said neck segment also having a smaller transverse dimension than said inboard segment adjacent thereto; and said outside surface at said inboard segment, neck segment, median segment, waist segment and outboard segment being substantially cylindrical in shape about a longitudinal axis therethrough.

20. A method for reducing longitudinal end play of an armature shaft of a motor relative to a housing thereabout, said method comprising the steps of:

(a) assembling said armature shaft within said housing, said armature shaft having a first end and a second end thereof upon each of which is a bearing surface, said housing having a bore longitudinally extending therein within which said armature shaft is rotatably journalled, said housing further having a tunnel defined by an inside surface extending longitudinally therethrough intersecting said bore therein proximate with said first end of said armature shaft;

(b) inserting a probe member into said tunnel of said housing, thereby touching said bearing surface at said first end of said armature shaft, so as to measure the relationship of said bearing surface at said first end of said armature shaft relative to said housing thereabout; and (c) installing an insert longitudinally into said tunnel of said housing a predetermined distance;

whereby an inboard end of said insert is proximate with said bearing surface at said first end of said armature shaft so as to set the longitudinal end play of said armature shaft within said housing.

21. The method of claim 20 further comprising the step of:

(a) compressing said insert into said tunnel of said housing.

22. The method of claim 21 further comprising the steps of:

(a) vibrating said insert with ultrasonic frequencies during installation thereof within said tunnel of said housing;

(b) melting a predetermined portion of said housing adjacent to said tunnel therewithin;

(c) removing said ultrasonic frequencies from said insert thereagainst; and (d) solidifying said predetermined portion of said housing adjacent to said tunnel therewithin so as to securely engage said insert firmly therein.

23. The method of claim 22 wherein:

said probe member and a means for compression are part of an ultrasonic welding apparatus.

24. The method of claim 20 wherein:

said insert is made from a metallic material and said housing is made from a thermoplastic polymeric material.

25. The method of claim 20 wherein said insert further includes:

an inboard segment being proximate with said inboard end adjacent thereto;

a neck segment longitudinally projecting from said inboard segment thereagainst;

a median segment longitudinally projecting from said neck segment thereagainst opposite from said inboard segment thereacross;

a waist segment longitudinally projecting from said median segment thereagainst opposite from said neck segment thereacross;

an outboard segment longitudinally projecting from said waist segment thereagainst, said outboard segment being proximate with an outboard end adjacent thereto; and said neck segment and said waist segment having a smaller transverse dimension than said median segment and said outboard segment therenear.

26. The method of claim 25 wherein:

said inboard segment of said insert has a smaller transverse dimension than said median segment and said outboard segment as compared thereto, said neck segment also has a smaller transverse dimension than said inboard segment adjacent thereto; and said outside surface at said inboard segment, neck segment, median segment, waist segment and outboard segment is substantially cylindrical in shape about a longitudinal axis therethrough.

27. The method of claim 25 wherein:

said inboard edge and said outboard edge of said insert are substantially flat.

28. The method of claim 25 wherein:

said outside surface of said insert is unthreaded and said outside surface at said median and outboard segments have a herringbone knurl pattern therearound.

29. A method for reducing longitudinal end play of an armature shaft of a motor relative to a housing thereabout, said method comprising the steps of:

(a) assembling said armature shaft within said housing, said armature shaft having a first end and a second end thereof upon each of which is a bearing surface, said housing having a bore longitudinally extending therein within which said armature shaft is rotatably journalled, said housing further having a tunnel defined by an inside surface extending longitudinally therethrough intersecting said bore therein proximate with said first end of said armature shaft;

(b) installing an insert longitudinally into said tunnel of said housing a predetermined distance;

whereby an inboard end of said insert is proximate with said bearing surface at said first end of said armature shaft so as to set the longitudinal end play of said armature shaft within said housing;

(c) vibrating said insert with ultrasonic frequencies during installation thereof within said tunnel of said housing;

(d) melting a predetermined portion of said housing adjacent to said tunnel therewithin;

(e) removing said ultrasonic frequencies from said insert thereagainst; and (f) solidifying said predetermined portion of said housing adjacent to said tunnel therewithin so as to securely engage said insert firmly therein.

30. The method of claim 29 wherein said insert further includes:

an inboard segment being proximate with said inboard end adjacent thereto;

a neck segment longitudinally projecting from said inboard segment thereagainst;

a median segment longitudinally projecting from said neck segment thereagainst opposite from said inboard segment thereacross;

a waist segment longitudinally projecting from said median segment thereagainst opposite from said neck segment thereacross;

an outboard segment longitudinally projecting from said waist segment thereagainst, said outboard segment being proximate with an outboard end adjacent thereto; and said neck segment and said waist segment having a smaller transverse dimension than said median segment and said outboard segment therenear.

31. The method of claim 29 further comprising the step of compressing said insert into said tunnel of said housing.

32. The method of claim 29, further comprising the step of inserting a probe member into said tunnel of said housing, thereby touching said bearing surface at said first end of said armature shaft, so as to measure the relationship of said bearing surface at said first end of said armature shaft relative to said housing thereabout.

33. The method of claim 29 further comprising the steps of:

(a) energizing an armature with DC electric current; and (b) rotating said armature shaft in relation to a fixed stator.

34. A motor comprising:

a motor housing having a tunnel defined by an inner surface extending through an end of said housing;

an armature shaft assembly rotatably journalled within said housing coaxial with said tunnel; and an insert having an outside surface bordered by an inboard end and an outboard end, said insert being firmly self-affixed within said tunnel of said housing, a portion of said armature shaft assembly being in contact with said inboard end of said insert such that said armature shaft is maintained in a longitudinal position relative to said housing.

35. The method of claim 34 wherein said insert further includes:
- an inboard segment proximate with said inboard end adjacent thereto;
- a neck segment longitudinally projecting from said inboard segment thereagainst;
- a median segment longitudinally projecting from said neck segment thereagainst opposite from said inboard segment thereacross;
- a waist segment longitudinally projecting from said median segment thereagainst opposite from said neck segment thereacross;
- an outboard segment longitudinally projecting from said waist segment thereagainst, said outboard segment being proximate with said outboard end adjacent thereto; and
- said neck segment and said waist segment having a smaller transverse dimension than said median segment and said outboard segment therenear.

36. The method of claim 34 wherein:

said inboard edge and said outboard edge of said insert are substantially flat.

37. The method of claim 34 wherein:

said insert is positioned within said tunnel of said housing by being compressibly inserted therein, an ultrasonic welding horn applies pressure upon said insert while transmitting ultrasonic frequencies therethrough so as to melt an adjacent portion of said housing surrounding said tunnel therethrough, said adjacent portion of said housing surrounding said tunnel subsequently resolidifying so as to securely engage said outside surface of said insert therein upon removal of said ultrasonic frequencies therefrom, whereby said insert is firmly affixed within said tunnel of said housing thereof.

38. The method of claim 34 wherein an outside surface of said insert has an unthreaded depressed pattern.

* * * * *

UNITED STATES PATENT AND TRADEMARK OFFICE
CERTIFICATE OF CORRECTION

PATENT NO. : 5,485,044
DATED : January 16, 1996
INVENTOR(S) : Jeffrey L. Mackay et al It is certified that error appears in the above-indentified patent and that said Letters Patent is hereby corrected as shown below:

Column 2, line 29, "motor/of" should be --motor of--

Column 2, line 42, "dc-motors" should be --dc motors--

Column 6, lines 49 and 50, claim 8, "thereabout," should be --thereabout.--

Column 11, line 4, claim 35, "method" should be --motor--

Column 12, line 1, claim 36, "method" should be --motor--

Column 12, line 4, claim 37, "method" should be --motor--

Column 12, line 20, claim 38, "method" should be --motor--

Signed and Sealed this

Tenth Day of September, 1996

Attest:

BRUCE LEHMAN

*Attesting Officer*    *Commissioner of Patents and Trademarks*